United States Patent
Shaver

(10) Patent No.: US 11,645,371 B2
(45) Date of Patent: May 9, 2023

(54) SECURING COMPUTING DEVICES

(71) Applicant: Hewlett-Packard Development Company, L.P., Spring, TX (US)

(72) Inventor: Charles Shaver, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/048,634

(22) PCT Filed: Sep. 14, 2018

(86) PCT No.: PCT/US2018/051112
§ 371 (c)(1),
(2) Date: Oct. 19, 2020

(87) PCT Pub. No.: WO2020/055426
PCT Pub. Date: Mar. 19, 2020

(65) Prior Publication Data
US 2021/0232664 A1 Jul. 29, 2021

(51) Int. Cl.
*G06F 21/31* (2013.01)
*G06F 21/57* (2013.01)

(52) U.S. Cl.
CPC .............. *G06F 21/31* (2013.01); *G06F 21/57* (2013.01)

(58) Field of Classification Search
CPC ................................. G06F 21/57; G06F 21/31
See application file for complete search history.

(56) References Cited

U.S. PATENT DOCUMENTS

| | | |
|---|---|---|
| 4,959,860 A | 9/1990 | Watters et al. |
| 5,404,527 A | 4/1995 | Irwin et al. |
| 6,237,100 B1 | 5/2001 | Cromer et al. |
| 6,298,447 B1 | 10/2001 | Wang |
| 6,397,337 B1 | 5/2002 | Garrett et al. |
| 6,615,356 B1 | 9/2003 | Byun |
| 7,096,496 B1 | 8/2006 | Challener |
| 7,254,722 B2 * | 8/2007 | Catherman ........... G06F 21/575 726/28 |
| 7,395,434 B2 | 7/2008 | Piwonka et al. |
| 8,893,265 B2 | 11/2014 | Lin et al. |
| 10,776,102 B1 * | 9/2020 | Dsouza .................. G06F 21/83 |
| 10,867,077 B2 * | 12/2020 | Berner .................... G06F 21/76 |
| 2002/0091946 A1 | 7/2002 | Satoh |
| 2010/0153752 A1 | 6/2010 | Tsukamoto et al. |
| 2012/0054498 A1 | 3/2012 | Rickman |
| 2012/0246708 A1 | 9/2012 | Chaudhry et al. |
| 2013/0185789 A1 | 7/2013 | Hagiwara et al. |

(Continued)

*Primary Examiner* — Tongoc Tran
(74) *Attorney, Agent, or Firm* — Quarles & Brady LLP

(57) ABSTRACT

Examples described herein relate to a system consistent with the disclosure. For instance, the system may comprise a display, a computing device, a display, an input mechanism commutatively coupled to the computing device, and an independent second processing resource to receive a password entry to unlock the computing device while the computing device is in a S5 state, determine a total number of incorrect password entry attempts to successfully unlock the computing device, save the total number of password entry attempts to a non-volatile memory of the independent second processing resource, and secure the computing device in response to a determination that the total number of incorrect password entry attempts exceeds a threshold value.

15 Claims, 5 Drawing Sheets

(56) References Cited

U.S. PATENT DOCUMENTS

| | | | | |
|---|---|---|---|---|
| 2014/0337969 A1* | 11/2014 | Li | ............................ | G06F 21/81 |
| | | | | 726/19 |
| 2016/0048663 A1* | 2/2016 | Gillespie | .................. | G06F 21/31 |
| | | | | 726/6 |
| 2016/0312089 A1* | 10/2016 | Kouno | .................. | C08G 65/336 |
| 2017/0041200 A1* | 2/2017 | Christopher | ............... | G06F 3/06 |
| 2019/0392181 A1* | 12/2019 | Puthillathe | ............... | G06F 21/44 |
| 2020/0089859 A1* | 3/2020 | Guan | ....................... | G06F 21/32 |

\* cited by examiner

SECURING COMPUTING DEVICES

BACKGROUND

Computer devices may shift between different power states, Computer devices may shift to some type of low power state when they are not in use. A computer device in a low power state may be woken up by an external wake-up event such as a mouse click, a key stroke, or a push of a button.

DETAILED DESCRIPTION

Computing devices may include a display screen to provide a visual to a user. In addition, computing devices may include an input mechanism to input characters into the computing device. Computing devices may transition into a low power state when the computing device is not in use. Further, computing devices may enter a locked state when not in use. The computing device may be in a low power state when it is in a locked state. To ensure that the computing device is accessed by an authorized user the computing device may use a password to prevent unauthorized users from accessing the computing device. Some computing devices may transition into a higher power state when a password is entered.

A password may be used to unlock the computing device which may be in a low power state when locked. If an incorrect password is entered, the computing device may remain locked. Some computing devices may enter a higher power state, as compared to the low power state, before a password is entered into the computing device. Transitioning into a higher power state in order for a user to access the computing device excess power may be expended. Transitioning into a higher power state before a password is entered into the computing device may cause the computing device to use more power even if an incorrect password is entered.

As such computing device, as described herein, may allow a user to enter a password while the computing device is in a S5 state. Accordingly, this disclosure describes unlocking a computing device in a S5 state using a password. The password entry attempts may be managed by an independent second processing resource.

Figure 1:
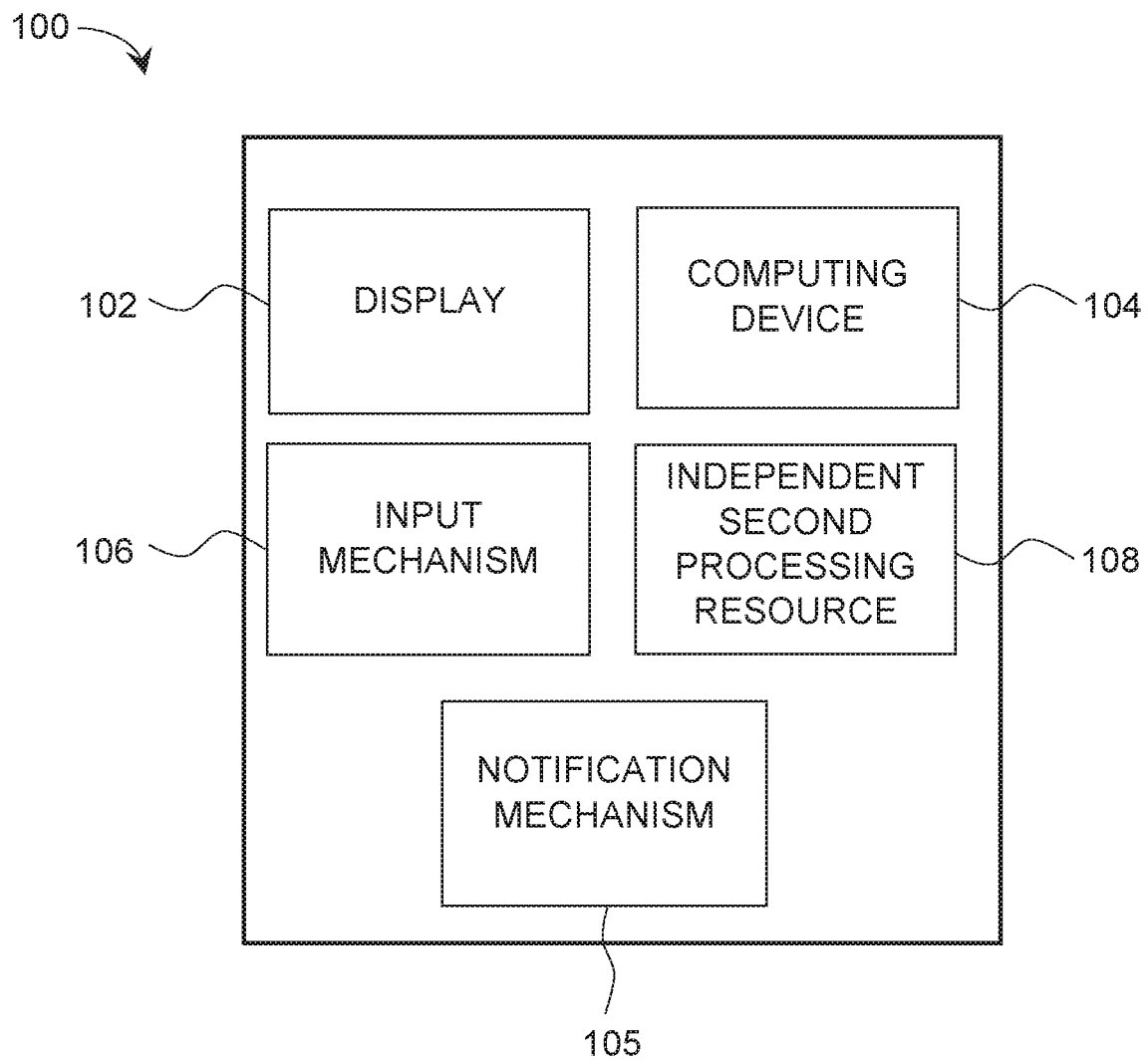
FIG. 1 illustrates an example of a system consistent with the disclosure.

FIG. 1 illustrates an example of a system consistent with the disclosure. The system 100 may be implemented in a variety of computing devices, such as laptops, desktops, tablets, etc. In some examples, the system 100 may include a computing device 104. The computing device 104 may have a first processing resource (e.g., first processing resource 210 of FIG. 2). As used herein, the term "first processing resource" is intended to mean the primary processing resource of a computing device. The primary processing resource may be a central processing unit (CPU) or processing core to the computing device 104 which has the primary responsibility of communicating with the software of the computing device 104.

In some examples, the system 100 may include an independent second processing resource 108. As used herein, the term "independent second processing resource" is intended to mean a secondary processing resource, separate from the computing device. For example, the second processing resource may be an ARM® processing chip. Alternatively, the second processing resource 108 may be a controller (e.g., field programmable gate array (FPGA), microcontroller, multi-point control unit (MCU), etc.), application specific integrated circuit (ASIC), etc., that may be separate from the computing device 104. The independent second processing resource 108 may communicate with the computing device 104 as the computing device 104 goes through the process of loading and unlocking.

In some examples, six distinct sleep states may be supported by and/or utilized by a computing device 104. In some examples, a S0 state may include a working mode and/or a modern (non S1-S3) standby mode of operation for a computing device 104. For example, the S0 state may include a mode of operation where the computing device 104 is fully operational. In addition, components of the computing device 104 that are being utilized may receive full power. However, some components that are not being utilized when operating in a S0 state may save power by entering a lower power consumption mode. For example, a display 102 may be off when no input to the system 100 has occurred for a designated period of time while operating in the S0 state. However, background tasks may continue to run. In the S0 state, the computing device 104 may be fully operational while operating. For example, a first processing resource may be executing instructions.

In some examples, a S1 state may include a mode of operation whereby the computing device 104 appears to be off. While operating in a S1 state the CPU may be stopped from executing instructions, the random-access memory (RAM) may be refreshed, and the computing device 104 may be operating in a low power mode, consuming less power than in the S0 state. In some examples, the power supply to the CPU and RAM may be maintained. While operating in the S1 state, some components of the system 100 such as an input mechanism, local area network (LAN), and/or USB component may continue to receive power to rapidly transition the computing device 104 into a S0 state.

In some examples, a S2 state may include a mode of operation whereby the CPU is operating in a low power mode, consuming less power than in the S1 state and the RAM is refreshed. When operating in the S2 state the dirty cache of the computing device 104 may be flushed to the RAM and the contents of the computing device 104 cache may be lost when the processor loses power. As used herein, the term "dirty cache" is intended to mean data currently held in the memory of the computing device. As used herein, the term "flushing" is intended to mean freeing the memory of the computing device of old, unused data. During operation in the S2 state, the CPU context and cache contents for the computing device 104 may be deleted. The computing device 104 cache may store temporary data for the computing device 104.

In some examples, a S3 state may include a mode of operation where the CPU is operating in a low power mode, consuming less power than in the S2 state and the RAM is in a slow refresh. In addition to the CPU being off, some of the microchips on the motherboard of the computing device 104 may be off. Transition from the S3 state to the S0 state may include software control starting from the CPU's reset vector. The computing device memory may be retained while the CPU context, cache contents, and chipset context may be lost in the S3 state.

In some examples, a S4 state may include a mode of operation characterized as hibernation. When operating in a S4 state, the hardware of the computing device 104 may be operating in a low power mode, consuming less power than in the S3 state and the context of the computing device 104 may be saved as a temporary hibernation file (e.g., an image of the device memory) in persistent memory before the computing device 104 enters a S4 state. After the transition from the S4 state to the S0 state, a computing device 104 may read the hibernation file and show the previous pre-hibernation context of the computing device 104. When operating in sleep states S1-S3, if a computing device 104 loses all power, the hardware context of the computing device 104 may be lost and the computing device 104 may reboot to return to a S0 state. However, a computing device 104 operating in the S4 state may restart from its previous location even after it loses power since the computing device's 104 software context is retained in the hibernation file. In some examples, the computing device 104 may use no power with the exception of a minor current, that may be sufficient to transition the computing device 104 to the S0 state.

In some examples, a S5 state may include a mode of operation characterized as the soft-off state or a full shut-down. The CPU and hardware components may be operating in a low power mode, consuming less power than in the S4 state. In some examples, power may be supplied to a powering mechanism of the computing device 104 to allow the computing device 104 to return to S0 state when the powering mechanism is actuated. However, transition from the S5 state to the S0 state may consist of a full reboot and no previous content may be retained. In the S5 state, the memory of the computing device 104 may not be performing any computational tasks but the computing device 104 may still receive power to allow a return to the working state. The entire user session may be deleted and restarted when the computing device 104 loads, That is, the computing device 104 may load by transitioning from the S5 state to the S0 state.

In some examples, a security measure to protect the system 100 from unauthorized access may include a requesting a password before unlocking and/or transitioning from a low power state to a higher power state. In some examples, there may be a limit on the number of password attempts, such that a computing device 104 may temporarily block the user for a period of time after a number of incorrect password attempts. As used herein, the term "password" is intended to mean a form of security used for user authentication to gain access to a system. For example, it may include but is not limited to pin numbers, passcodes, passkey, eye scan, or facial recognition etc.

In some examples, the independent second processing resource 108 may receive a password entry to unlock the computing device 104 while the computing device 104 is in a S5 state. The independent second processing resource 108 may determine whether the total number of incorrect password entry attempts to unlock the computing device 104 exceeds the threshold value. That is, the independent second processing resource 108 may determine if a password entry attempt is correct. In some examples, an administrator may set a threshold value for the total number of incorrect password entry attempts. At each password entry attempt, the independent second processing resource 108 may check if a password entry attempt is correct.

As used herein, the terms "unlock" "unlocking" or "unlocked" are intended to mean the process taken by the computing device when the correct password is entered and the computing device becomes available for use. In some examples, the computing device 104 may enter a locked state when not in use. In some examples, if the total number of incorrect password entry attempts to successfully unlock the computing device exceeds a threshold value the independent second processing resource 108 may secure the computing device. As used herein, the term "securing a computing device" is intended to mean the act of preventing a password entry to unlock a computing device and/or preventing the computing device from unlocking. That is, after the total number of incorrect password entry attempts exceeds the threshold value, the computing device 104 may refuse to unlock and may not accept password entry attempts.

As used herein, the terms "loading" or "to load" or "loaded" or "loads" are intended to mean the process taken by the computing device when it is booting up and preparing the software of the computing device for use. Loading may be the process where the computing device 104 completes a resumption process from a lower powered state to a S0 state. For example, loading may describe the process of transitioning from the S5 state to the S0 state. Loading may also describe the process after an administrator uses the setup utility menu to reset the total number of password entry attempts within the non-volatile memory of the independent second processing resource 108 to zero.

In some examples, the setup utility menu may be referred to as the Basic Input Output System (BIOS), which is a non-volatile firmware used to perform hardware initialization during a booting process and/or startup and to provide runtime services for the software of the computing device 104. A BIOS may be pre-installed when the system 100 is purchased. However, this disclosure is not so limited. In some examples, the BIOS may be installed after the computing device 104 is purchased. In some instances, management components of BIOS options may be triggered to load a computing device 104 from a lower power state. The BIOS setup utility menu may be triggered through a user input or signal to the computing device 104.

In some examples, the independent second processing resource 108 may save the total number of password entry attempts to a non-volatile memory of the independent second processing resource 108. Saving the total number of password entry attempts to the non-volatile memory may ensure that the total number of password entry attempts remains on the computing device 104 until the computing device 104 is successfully unlocked or loaded. That is, even after power is removed from the computing device 104, the total number of password entry attempts may remain on the computing device 104 until the computing device 104 has successfully unlocked or loaded. However, if the correct password is entered, the total number of password entry attempts within the non-volatile memory of the independent second processing resource 108 may automatically be reset to zero and the computing device 104 may unlock. That is, the non-volatile memory of the independent second processing resource 108 may restart the count for the total number of password entry attempts.

In some examples, the system 100 may also include an input mechanism 106. As used herein, the term "input mechanism" is intended to mean a device used to input text or other commands into a system. For example, an input mechanism 106 may be a virtual keyboard, a physical keyboard, a keypad, a mouse, a fingerprint reader, a touchscreen, a speaker, voice capture, etc.

In some examples, the system 100 may include a display 102. As used herein, the term "display" is intended to mean a user interface in the form of a screen to output information to a user. For example, a display 102 may include hardware, circuitry, logic and a user interface (e.g., touch screen), In some examples, the display 102 may include a light emitting diode (LED) screen type, an organic light emitting diode (OLED) screen type, a dual side emission OLED screen type, etc. In some examples, the display 102 may remain off while the password is entered into the computing device 104 which may remain in the S5 state. In some examples, while the independent second processing resource 108 and the input mechanism 106 are activated, the display 102 and other components of the system 100 may remain in the S5 state.

In some examples, the system 100 may include a notification mechanism 105 to notify the user an incorrect password has been entered. As used herein, the term "notification mechanism" is intended to mean a method to alert the user. For example, the notification mechanism 105 may be a light source to signify an incorrect password entry. That is, the light source may notify the user when an incorrect password is entered. In some examples, the light source may remain on when the total number of incorrect password entry attempts exceeds a threshold value. However, this disclosure is not so limited. In some examples the light source may flash, that is the light source may turn on and off, to notify the user when an incorrect password is entered. In some examples, the light source may be a light-emitting diode. In some examples, the light source may be coupled to the system 100 in a manner that may be visible to the user when entering a password. That is, the light source may be coupled to the outside of the computing device 104, a portion of the display 102, or a portion of the input mechanism 106, amongst other locations.

In some examples, the notification mechanism 105 may be an audio device to produce a sound to signify to a user that an incorrect password has been entered. In some examples, the audio device may be coupled to the computing device 104. However, this disclosure is not so limited. In some examples, the audio device may be coupled to the display 102. As used herein, the terms "in contact," "connected to", or "coupled to" is intended to mean that the element may be directly in contact, connected, or coupled with the other element or intervening elements may be present. As used herein, the term "communicatively coupled" refers to various wired and/or wireless connections between devices such that data and/or signals may be transferred in various directions between the devices.

Figure 2:
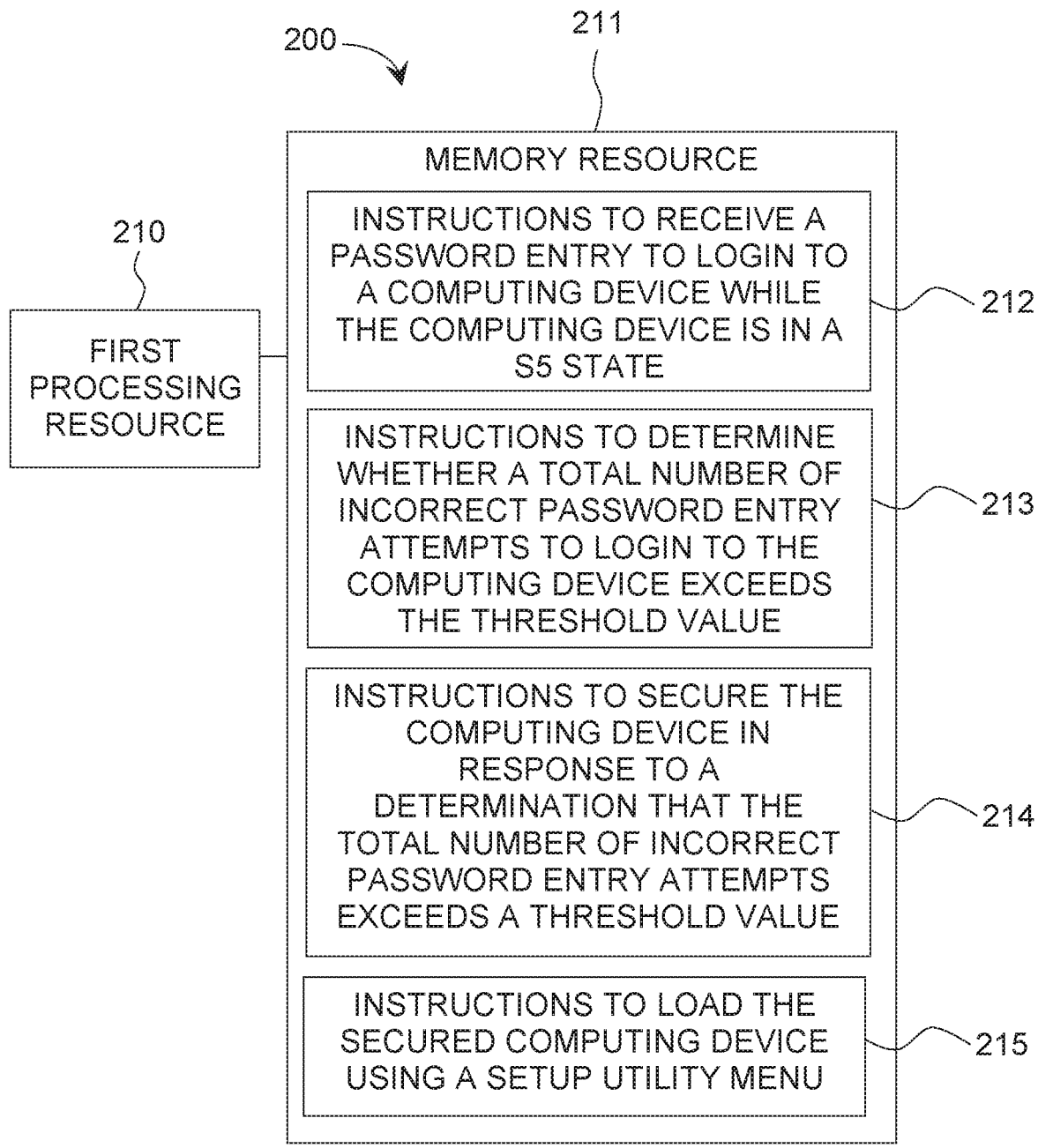
FIG. 2 illustrates an example of a first processing resource and an example memory resource of an example apparatus including a computing device.

FIG. 2 illustrates an example of a first processing resource 210 and an example memory resource 221 of an example apparatus including a computing device. As illustrated in FIG. 2, the apparatus 200 includes a first processing resource 210 and a memory resource 211. The first processing resource 210 may be a hardware processing unit such as a microprocessor, application specific instruction set processor, coprocessor, network processor, or similar hardware circuitry that may cause machine-readable instructions to be executed. In some examples, the first processing resource 210 may be a plurality of hardware processing units that may cause machine-readable instructions to be executed. The first processing resource 210 may include central processing units (CPUs), application specific integrated circuit (ASIC), among other types of processing units. The memory resource 211 may be any type of volatile or non-volatile memory or storage, such as random-access memory (RAM), flash memory, read-only memory (ROM), storage volumes, a hard disk, or a combination thereof.

The memory resource 211 may store instructions thereon, such as instructions 212, 213, 214 and 215. When executed by the first processing resource 210, the instructions may cause the independent second processing resource to perform specific tasks and/or functions. For example, the memory resource 211 may store instructions 212 which may be executable by a first processing resource 210 to cause the independent second processing resource (e.g., the independent second processing resource 108 of FIG. 1) to receive a password entry to login to a computing device (e.g., computing device 104 of FIG. 1) while the computing device is in a S5 state. That is, a user may enter a password to attempt to log into the computing device to transition from a S5 state to a higher state.

The memory resource 211 may store instructions 213 executable by a first processing resource 210 to cause the independent second processing resource to determine whether the total number of incorrect password entry attempts to login to the computing device 104 exceeds the threshold value. That is, the independent second processing resource may determine if a password entry is correct. If the password entry is correct the user may log in and use the computing device. In contrast, if the password entry is incorrect the computing device may remain locked until a correct password is entered. In some examples, an administrator may set the threshold value of incorrect password entry attempts. However, this disclosure is not so limited. In some examples, the threshold value may be preset to the independent second processing resource. The user may continue to enter a password into the computing device until the total number of incorrect password entry attempts exceeds the threshold value.

The memory resource 211 may store instructions 214 executable by a first processing resource 210 to cause the independent second processing resource to secure the computing device in response to a determination that the total number of incorrect password entry attempts exceeds a threshold value. If the independent second processing resource determines that the total number of incorrect password entry attempts exceeds the threshold value, then the independent second processing resource may secure the computing device. In some examples, the computing device may refuse to accept a password entry attempt until the computing device loads. However, if the correct password is entered, the total number of password entry attempts within the non-volatile memory of the independent second processing resource may automatically be reset to zero and the user may be able to login to and use the computing device. In some examples, the independent second processing resource may check the non-volatile memory of the independent second processing resource for the number of password attempts before allowing a user enter a password.

The memory resource 211 may store instructions 215 executable by a first processing resource 210 to cause the independent second processing resource to load the secured computing device using a setup utility menu. In the setup utility menu, an administrator may reset the total number of password entry attempts within the non-volatile memory of the independent second processing resource to zero and unlock the computing device. After an administrator unlocks the computing device the user may be able to login to and use the computing device.

Figure 3:
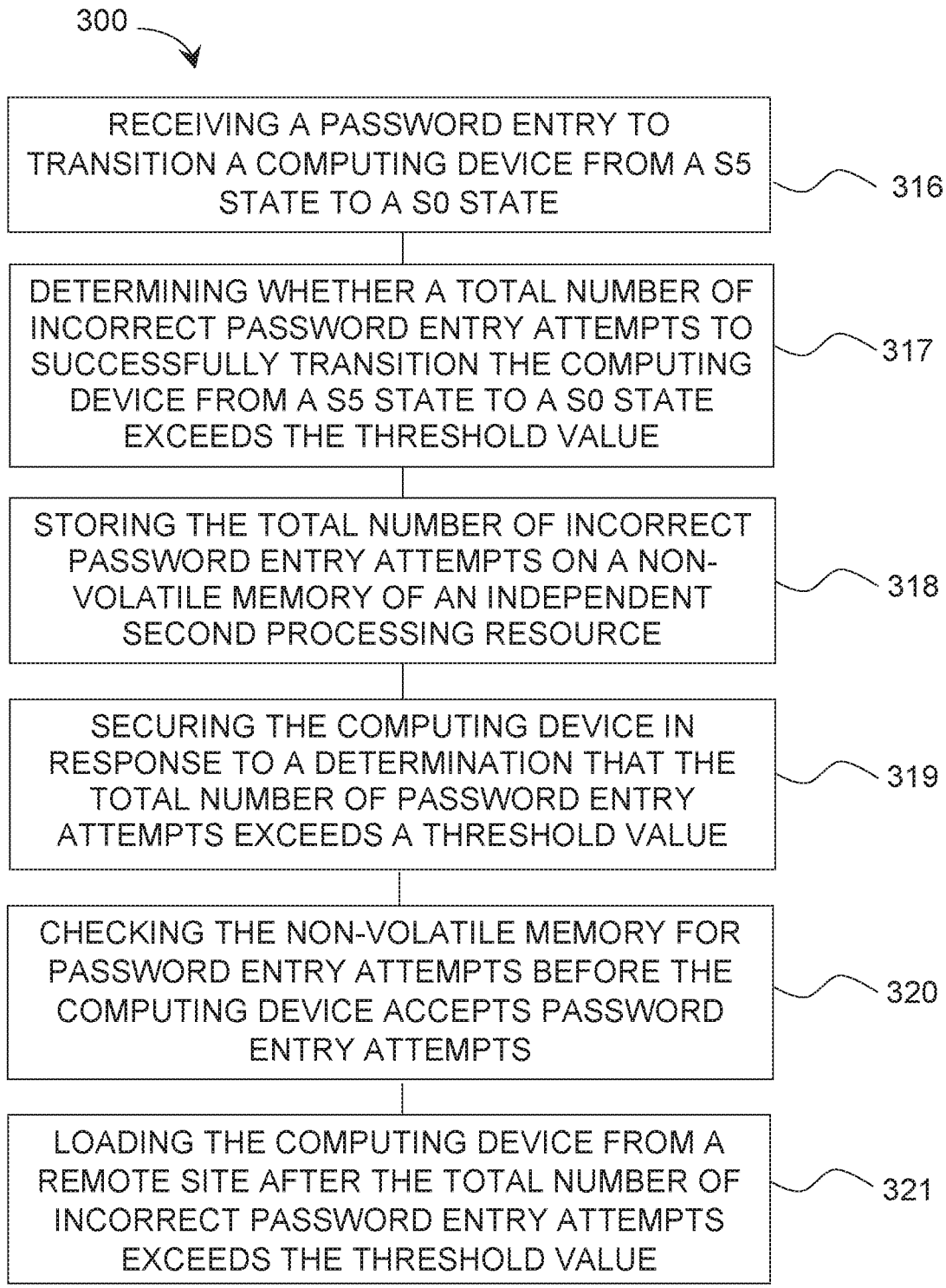
FIG. 3 illustrates an example of a method consistent with the disclosure.

FIG. 3 illustrates an example of a method consistent with the disclosure. Method 300 may be performed, for example, by an independent second processing resource (e.g., the independent second processing resource 108 of FIG. 1). At 316, the method 300 may include receiving a password entry to transition a computing device from a S5 state to a S0 state. The independent second processing resource may receive a password entry in an attempt to transition the system (e.g., system 100 of FIG. 1) to a S0 state while the computing device (e.g., computing device 104 of FIG. 1) is in a S5 state.

At 317, the method 300 may include determining whether a total number of incorrect password entry attempts to successfully transition the computing device from a S5 state to a S0 state exceeds the threshold value. That is, the independent second processing resource may determine if the password entry attempt is correct or if the total number of incorrect password entry attempts exceeds the threshold value. In some examples, the user may continue to enter a password into a computing device until the total number of incorrect password entry attempts exceeds a threshold value.

At 318, the method 300 may include storing the total number of password entry attempts on a non-volatile memory of an independent second processing resource. The total number of password entry attempts may be stored within the non-volatile memory of the independent second processing resource to allow the computing device to check if the total number of incorrect password entry attempts exceeds a threshold value before allowing a password to be entered. In some examples, the non-volatile memory of the independent second processing resource may retain the number of password entry attempts even if power is removed from the system. That is, the total number of password entry attempts may remain on the non-volatile memory of the independent second processing resource even if power is removed from the computing device or the system is shut down or any other interruption while the user enters the password. In some examples, the independent second processing resource may be connected to the computing device 104 by a USB. In some examples, the independent second processing resource may operate independently from the computing device.

At 319, the method 300 may include securing the computing device in response to a determination that the total number of incorrect password entry attempts exceeds a threshold value. To secure the computing device after the total number of incorrect password entry attempts exceeds the threshold value, the computing device may remain in the S5 state and may not accept a password entry attempt until an administrator resets the computing device and the computing device transitions from the computing device from a S5 state to a S0 state. However, if the correct password is entered, the total number of password entry attempts within the non-volatile memory of the independent second processing resource may automatically be reset to zero and the computing device may transition the computing device from a S5 state to a S0 state.

At 320, the method 300 may include checking the non-volatile memory for password entry attempts before the computing device accepts password entry attempts. The independent second processing resource may check the non-volatile memory of the independent second processing resource for the number of password attempts before accepting a password entry attempt. After each password entry, the independent second processing resource may check the total number of incorrect password entry attempts within the non-volatile memory of the independent second processing resource before allowing another password entry attempt.

At 321, the method 300 may include loading the computing device from a remote site after the total number of incorrect password entry attempts exceeds the threshold value. While resetting the computing device, the administrator may not be located in the same vicinity as the computing device. The administrator may be able to use the setup utility menu to reset the total number of password entry attempts within the non-volatile memory of the independent second processing resource to zero from a remote site.

Figure 4:
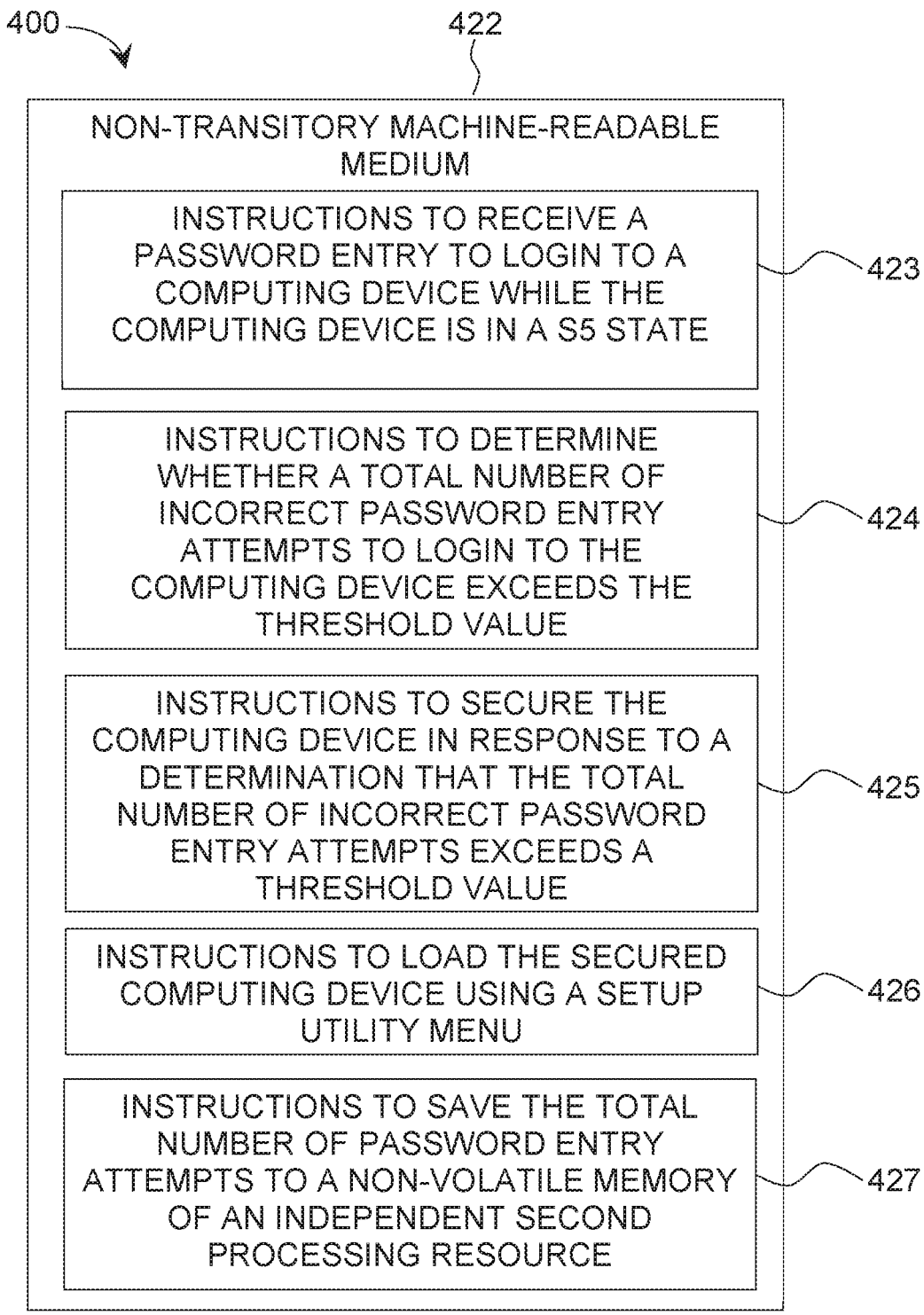
FIG. 4 illustrates an example of a non-transitory machine-readable medium consistent with the disclosure.

FIG. 4 illustrates an example of a non-transitory machine-readable medium. A first processing resource may execute instructions stored on the non-transitory machine-readable medium 422. The non-transitory machine-readable medium 422 may be any type of volatile or non-volatile memory or storage, such as random-access memory (RAM), flash memory, read-only memory (ROM), storage volumes, a hard disk, or a combination thereof.

The non-transitory machine-readable medium 422 may store instructions 423 executable by a first processing resource to cause the independent second processing resource to receive a password entry to login to a computing device while the computing device is in a S5 state. In some examples, the first processing resource may receive a password entry in an attempt to log into the computing device e.g., computing device 104 of FIG. 1) while it is in a S5 state. That is, a user might enter a password to attempt to log into the computing device.

The non-transitory machine-readable medium 422 may store instructions 424 executable by a first processing resource to cause the independent second processing resource to determine whether a total number of incorrect password entry attempts to login to the computing device exceeds the threshold value. That is, the independent second processing resource may determine if a password entry attempt is correct. In some examples, an administrator may set a threshold value of incorrect password entry attempts. The independent second processing resource (e.g., the independent second processing resource 108 of FIG. 1) may check the total number of incorrect password entry attempts within the non-volatile memory of the independent second processing resource before allowing another password entry attempt. The user may attempt to log in until the total number of incorrect password entry attempts exceeds the threshold value.

The non-transitory machine-readable medium 422 may store instructions 425 executable by a first processing resource to cause the independent second processing resource to secure the computing device in response to a determination that the total number of incorrect password entry attempts exceeds a threshold value. In some examples, the independent second processing resource may determine that the total number of incorrect password entry attempts exceeds the threshold value set by the administrator. The independent second processing resource may then seek to secure the computing device. To secure the computing device after the total number of incorrect password entry attempts exceeds the threshold value, the computing device may refuse to accept a password entry attempt until the computing device loads. However, if the correct password is entered, the total number of password entry attempts within the non-volatile memory of the independent second processing resource may automatically be reset to zero and the user may log in and use the computing device.

The non-transitory machine-readable medium 422 may store instructions 426 executable by a first processing resource to cause the independent second processing resource to load the secured computing device using a setup utility menu. The administrator may load the secured computing device by resetting the total number of password entry attempts within the non-volatile memory of the independent second processing resource to zero and the computing device may load and the user may be able to log into the computing device.

The non-transitory machine-readable medium 422 may store instructions 427 executable by a first processing resource to cause the independent second processing resource to save the total number of password entry attempts to a non-volatile memory of an independent second processing resource. The total number of password entry attempts may be saved to the non-volatile memory such that the computing device may check if the total number of incorrect password entry attempts exceeds the threshold value. The total number of password entry attempts may remain on the non-volatile memory of the independent second processing resource even if power is disrupted from the computing device or the system is shut down or any other interruption while the user enters the password to log into the computing device. The computing device may keep track of the total number of password entry attempts even if power is disrupted or the apparatus is shut down.

In some examples, the independent second processing resource may become activated when the computing device is in a S5 state. In addition, the independent second processing resource may not become activated until the computing device is in the S5 state. That is, when the computing device enters the S5 state, the independent second processing resource may monitor the activities of the computing device, while the computing device is in the S5 state.

Figure 5:
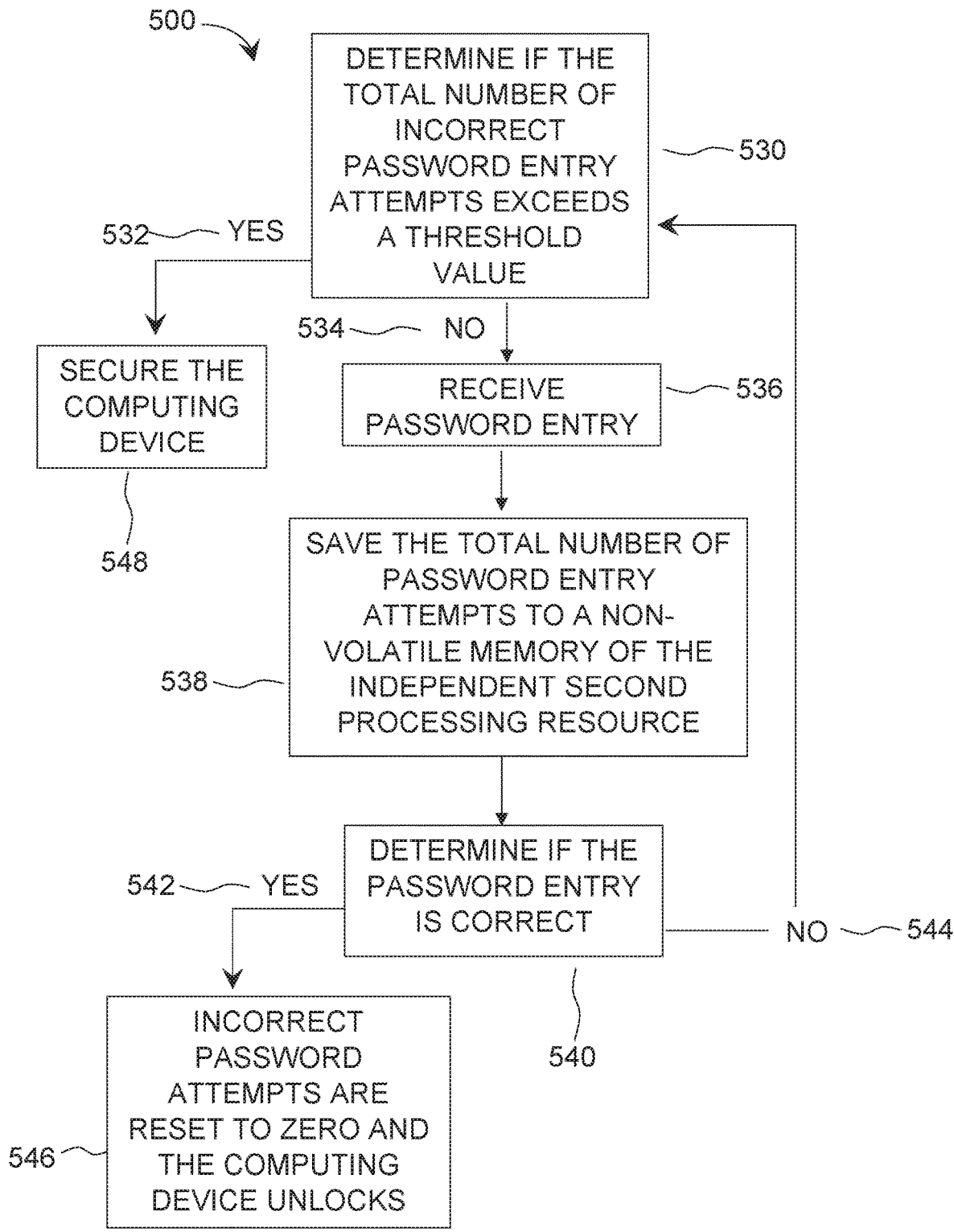
FIG. 5 illustrates an example of a flow diagram suitable for use with computing devices.

FIG. 5 illustrates an example of a flow diagram 500 suitable for use with computing devices. As shown in FIG. 5, at block 530 an independent second processing resource (e.g., the independent second processing resource 108 of FIG. 1) may determine if the total number of incorrect password entry attempts exceeds a threshold value. In some examples, if the independent second processing resource determines that a total number of incorrect password entry attempts exceeds a threshold value ("yes" at 532), the independent second processing resource may secure the computing device at block 548. In contrast, if the independent second processing resource determines that the total number of incorrect password entry attempts does not exceed a threshold value ("no" at 534), the computing device may receive a password entry at block 536.

At block 538, the independent second processing resource may save the total number of password entry attempts to a non-volatile memory of the independent second processing resource. In some examples, the independent second processing resource may determine if the password entry is correct at block 540. In some examples, if the independent second processing resource determines that the password entry is correct ("yes" at 542), the incorrect password attempts are reset to zero and computing device unlocks at block 546. In contrast, if the independent second processing resource determines that the password entry is not correct ("no" at 544), the independent second processing resource may return to block 530 to determine if the total number of incorrect password entry attempts exceeds a threshold value.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense.

It should be understood that the descriptions of various examples may not be drawn to scale and thus, the descriptions may have a different size and/or configuration other than as shown therein.

What is claimed is:

1. A system comprising:
a computing device;
a display;
an input mechanism communicatively coupled to the computing device; and
an independent second processing resource to:
receive a password entry to unlock the computing device while the computing device is in a S5 state;
determine whether a total number of incorrect password entry attempts to successfully unlock the computing device exceeds a threshold value;
save the total number of incorrect password entry attempts to a non-volatile memory of the independent second processing resource;
secure the computing device so the computing device does not accept password entry attempts, while the computing device is in the S5 state, in response to a determination that the total number of incorrect password entry attempts exceeds the threshold value;
reset, via the setup utility menu, the total number of incorrect password entry attempts saved in the non-volatile memory of the independent second processing resource to zero; and
subsequent to the reset of the total number of incorrect password entry attempts, permit the computing device to accept a password entry attempt.

2. The system of claim 1, further comprising a notification mechanism to signify an incorrect password entry, wherein the notification mechanism is a light emitting diode or audio device that is separate from the display.

3. The system of claim 1, wherein the total number of incorrect password entry attempts is reset to zero.

4. The system of claim 1, wherein the independent second processing resource is connected to the computing device by Universal Serial Bus (USB).

5. The system of claim 1, wherein the input mechanism is a keyboard.

6. The system of claim 1, wherein the display remains off while the password entry is entered into the secured computing device.

7. A non-transitory machine-readable medium storing instructions that, when executed by a processing resource, cause the processing resource to:
receive a password entry to login to a computing device while the computing device is in an off state;
determine whether a total number of incorrect password entry attempts to login to the computing device exceeds a threshold value;
secure the computing device so the computing device does not accept password entry attempts, while the computing device is in the off state, in response to a determination that the total number of incorrect password entry attempts exceeds the threshold value;
load the secured computing device using a setup utility menu;
reset, via the setup utility menu, the total number of incorrect password entry attempts to zero; and subsequent to the reset of the total number of incorrect password entry attempts and load of the secured computing device, permit the computing device to accept a password entry attempt.

8. The medium of claim 7, wherein the processing resource further comprises an independent second processing resource that is activated when the computing device enters the off state.

9. The medium of claim 7, wherein the total number of incorrect password entry attempts is saved to a non-volatile memory.

10. A method comprising:
receiving a password entry to transition a computing device from a S5 state to a S0 state from a keyboard coupled to the computing device while a display of the computing device is powered off;
determining whether a total number of incorrect password entry attempts to successfully transition the computing device from a S5 state to a S0 state exceeds a threshold value;
storing the total number of password entry attempts on a non-volatile memory of an independent second processing resource;
securing the computing device so the computing device does not accept password entry attempts, while the computing device is in the S5 state, in response to a determination that the total number of incorrect password entry attempts exceeds a threshold value;
resetting, via a setup utility menu the total number of incorrect password entry attempts to zero; and
subsequent to the resetting the total number of incorrect password entry attempts, permitting the computing device to accept a password entry attempt.

11. The method of claim 10, comprising checking the non-volatile memory for incorrect password entry attempts before the computing device accepts password entry attempts.

12. The method of claim 10, further comprising resetting the total number of incorrect password entry attempts from a remote site.

13. The system of claim 1, wherein the independent second processing resource is to receive the password entry from the input mechanism to unlock the computing device while the computing device is in the S5 state and the display is powered off.

14. The medium of claim 7, wherein the password entry is received from a keyboard coupled to a computing device while the computing device is in the off state and a display of the computing device is powered off.

15. The method of claim 10, wherein further comprising receiving the password entry to transition the computing device from the S5 state to the S0 state from a keyboard coupled to the computing device while a display of the computing device is powered off.

* * * * *